Jan. 4, 1966 D. E. REED ETAL 3,227,840
POLARIZED RELAY HAVING WIRE MESH CONTACTS
Filed June 15, 1962 5 Sheets-Sheet 1
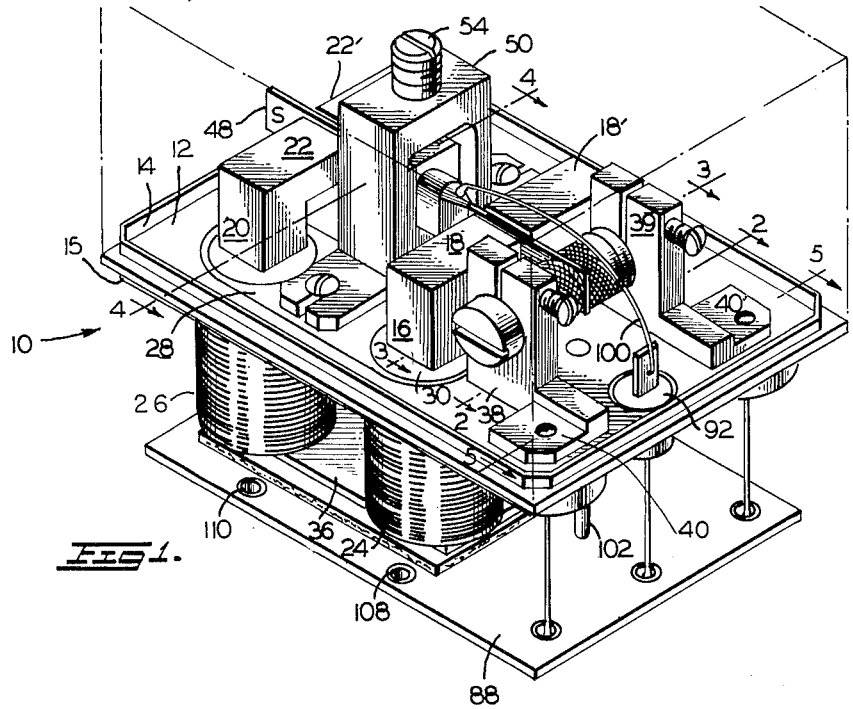
FIG 1.
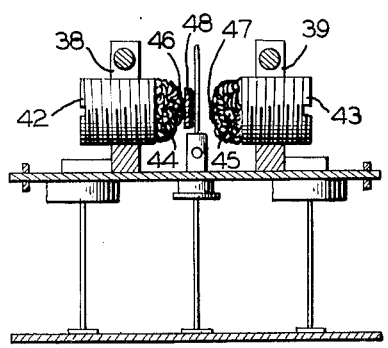
FIG 2.
INVENTORS
DONALD E. REED
JOHN L. TOTH
EDWARD R. FAIRBANKS
BY 
ATTORNEY

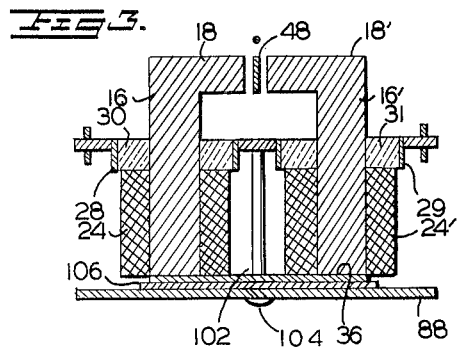
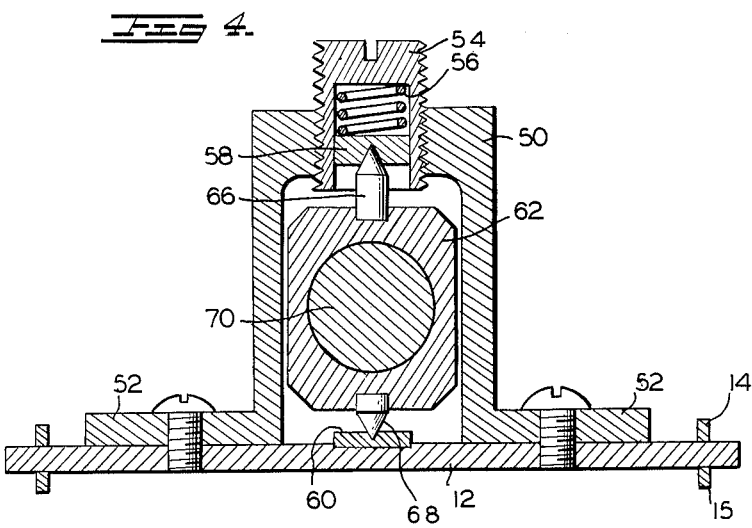
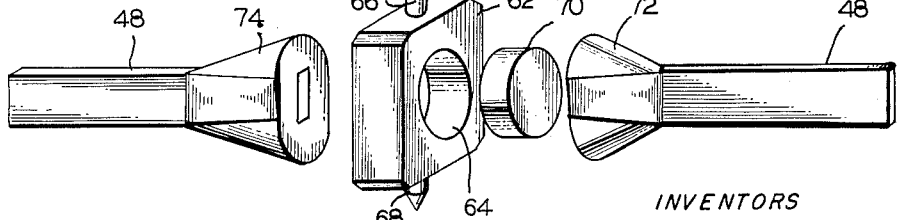
INVENTORS
DONALD E. REED
JOHN L. TOTH
EDWARD R. FAIRBANKS
BY 
ATTORNEY

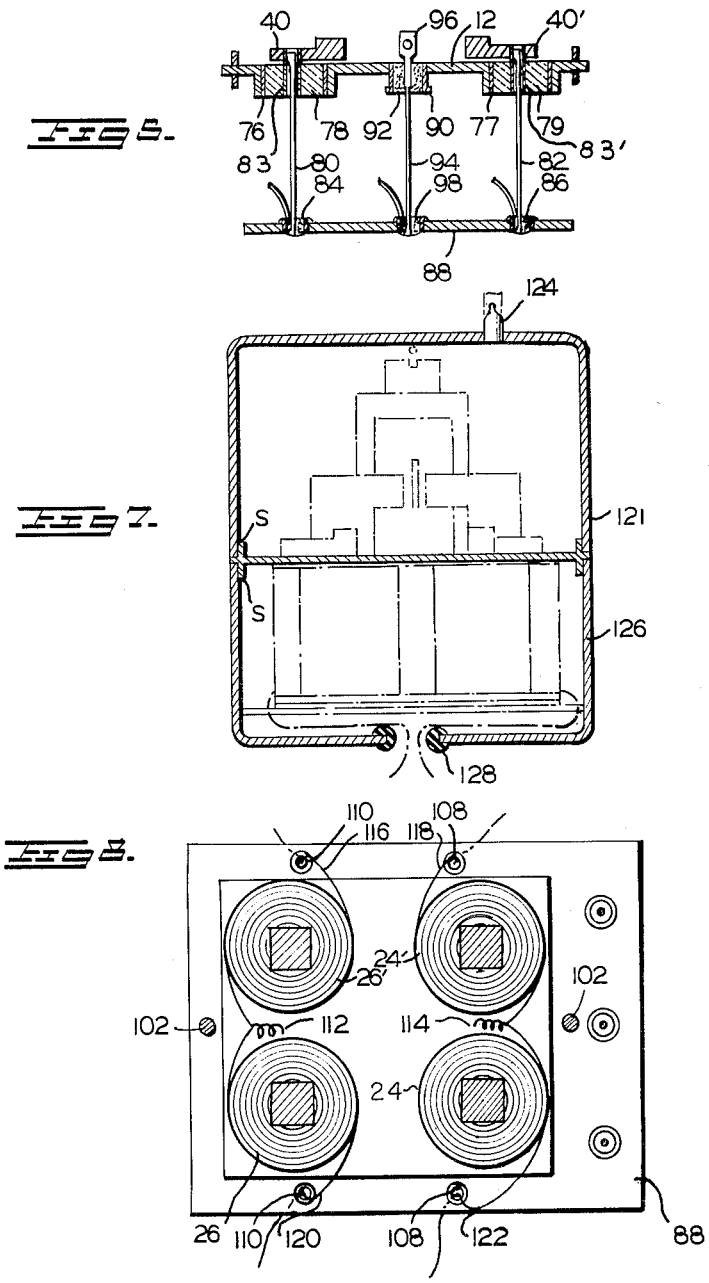

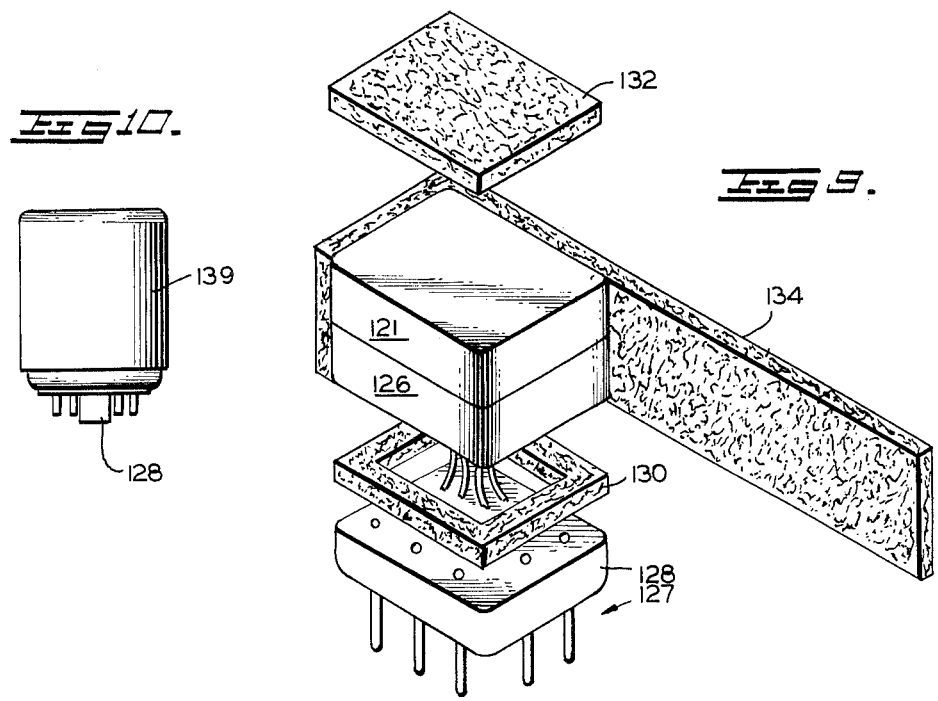
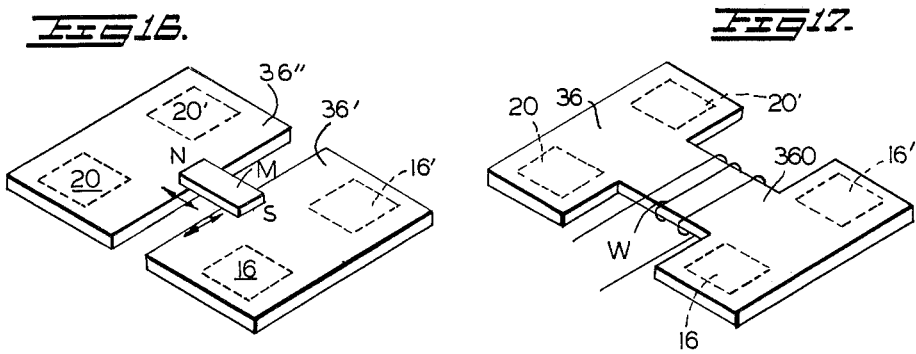
INVENTORS
DONALD E. REED
JOHN L. TOTH
EDWARD R. FAIRBANKS
BY 
ATTORNEY Jan. 4, 1966  D. E. REED ETAL  3,227,840
POLARIZED RELAY HAVING WIRE MESH CONTACTS
Filed June 15, 1962  5 Sheets-Sheet 5
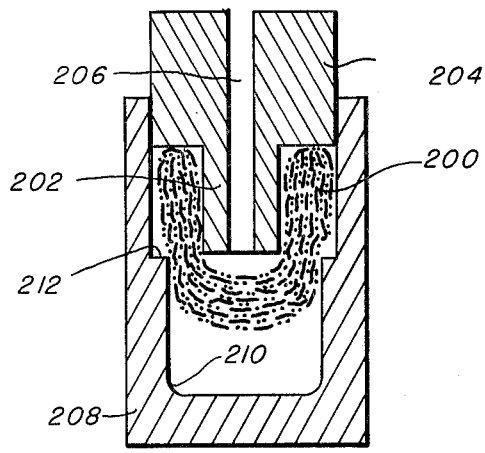
Fig 11
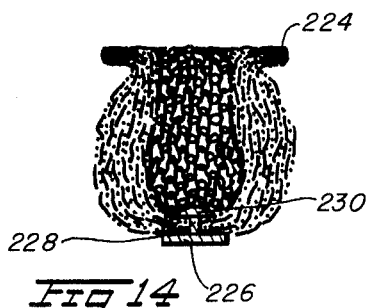
Fig 14
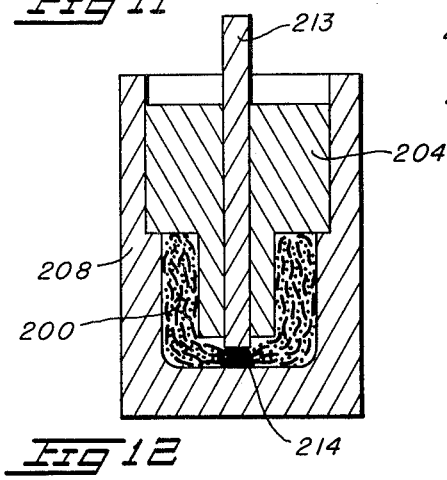
Fig 12
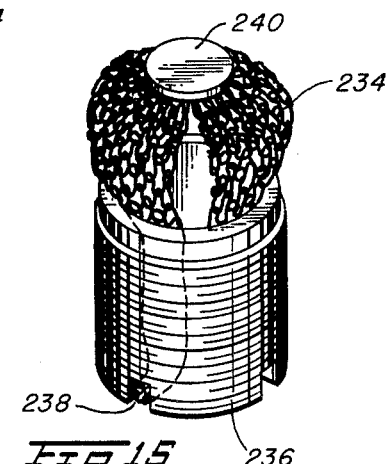
Fig 15
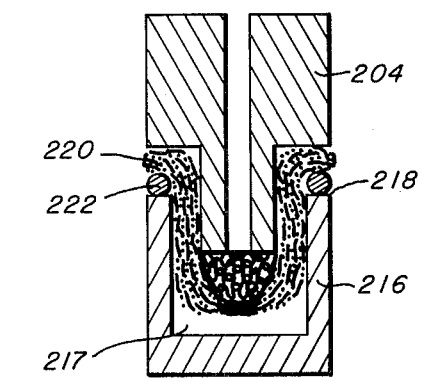
Fig 13
INVENTORS
DONALD E. REED
JOHN L. TOTH
EDWARD R. FAIRBANKS
BY 
ATTORNEY United States Patent Office 3,227,840
Patented Jan. 4, 1966

3,227,840
POLARIZED RELAY HAVING WIRE
MESH CONTACTS
Donald E. Reed, Kensington, Md., John L. Toth, Fairfax, Va., and Edward R. Fairbanks, Silver Spring, Md., assignors to Space Components, Inc., Washington, D.C., a corporation of the District of Columbia
Filed June 15, 1962, Ser. No. 202,860
3 Claims. (Cl. 200—93)

This invention relates to electromagnetic relays and more particularly electromagnetic relays wherein the armature is polarized. The field pieces of the relay are of low retentivity and the polarization of the armature provides a bi-stable operation, i.e., an operation wherein the armature will remain in the last position in which it was compelled to assume by the actuating fields associated therewith.

According to the invention an electromagnetic polarized relay has all of its operating elements positioned in a captive atmosphere, this portion of the relay being hermetically sealed and containing suitable gases which form the atmosphere.

The invention is further characterized by the inclusion of more than a single pair of field pieces to actuate the armature, the plurality of pairs of field pieces lying on opposite sides of a pivot point of the armature. A further characterization of the invention is the inclusion of a common magnetic path between the plurality of pairs of field pieces, the path being separate and distinct from the armature. By virtue of such a construction, a complete return path for all lines of flux from the field pieces is provided. Such provision produces a greater torque on the polarized armature for every unit of actuating current applied to the field pieces and greater sensitivity of the relay.

The invention is still further characterized by a novel electrical contact element for cooperation with the armature to complete a circuit. The contact element is formed of thin metal mesh which functions as an energy absorber, i.e., it absorbs most of the kinetic energy of the armature upon actuation thereof and thereby materially reduces chattering or vibration of the armature immediately after contact. The novel electrical contact according to this invention enjoys the further advantage that the point thereof which is contacted by the armature to effect electrical connection may, for certain applications, be made of a material different from the thin wire mesh, thereby combining the desirable characteristics of certain conductors with the desirable mechanical qualities of the mesh.

Yet another characteristic of the invention is the provision, in certain embodiments thereof, of means to equalize the magnetic flux passing through the various field pieces to and from the armature and thus compensate for any variations in magnetic reluctance of any portion of the magnetic circuit.

In the drawings:

FIGURE 1 is a perspective view of the relay according to this invention.

FIGURE 2 is a section along line 2—2 of FIGURE 1.

FIGURE 3 is a section taken along line 3—3 of FIGURE 1.

FIGURE 4 is a section taken along line 4—4 of FIGURE 1.

FIGURE 5 is a section taken along line 5—5 of FIGURE 1.

FIGURE 6 is an exploded view showing the assembly of the armature of the relay of FIGURE 1.

FIGURE 7 is a cross-section of the relay of FIGURE 1 showing upper and lower casing sections affixed thereto, the outlines of the relay being dashed.

FIGURE 8 is a top-plan view, partly schematic, showing the relative locations of certain elements of the relay.

FIGURE 9 is an exploded view of the relay encased, showing one manner of insulating it against shock.

FIGURE 10 is a view of the final assembly of the relay and its mounting.

FIGURES 11, 12, and 13 are cross-sectional views of die elements fabricating mesh contact elements.

FIGURE 14 is a view showing a modified form of contact button element in conjunction with a contact element formed by the steps shown in FIGURES 11, 12, and 13.

FIGURE 15 is a perspective showing a further modification of a contact member.

FIGURES 16 and 17 are schematic views of two modifications for polarizing the relay of FIGURE 1.

Referring now to FIGURES 1 to 3 of the drawings, the numeral 10 indicates the relay of this invention, and includes a mounting plate 12 preferably formed of a non-magnetic metal, brass having been found suitable. The upper and lower peripheries of the mounting plate 12 are provided with integral, upstanding circumferential lips 14 and 15 respectively to facilitate the placement of upper and lower covers on the relay, to be described hereafter. The numerals 16 and 20 denote field pieces of magnetic material, preferably ferrite, of generally L-shape having leg portions 18 and 22 respectively. There are four such field pieces, two of which are denoted by primes. The field pieces 16 and 20 are surrounded by windings 24 and 26 respectively. Again, two of the latter are denoted by primes. Numerals 28 and 29 denote metallic inserts fitted in complementary recesses in mounting plate 12 and extending completely therethrough. Numerals 30 and 31 denote glass portions hermetically fitted into and bounded by each insert and through which hermetically passes each field piece. Plate 12, inserts 28 and 29, and glass portions 30 and 31 form a hermetic seal between the upper and lower portions of the plate. It has been found that ferrite exhibits both the required electrical properties for the field pieces of this relay and susceptability to encasing by the glass portions 30 and 31, thereby allowing for hermetic sealing. Ferrite has a high ohmic resistance and high permeability, the former minimizing eddy current losses. Conventional homogeneous materials of high permeability gives rise to undesirable eddy current losses while such non-homogeneous materials, i.e., laminated, were found unsuitable because of the small but finite space between the laminations which precluded complete hermetic sealing. Numeral 36 denotes a plate of magnetic material, also preferably ferrite, which abuts the lower ends of the field pieces, the ends being lapped to provide full and uniform contact. Plate 36 forms a common magnetic path for the field pieces.

The numerals 38 and 39 denote a pair of contact mounting brackets, each provided with ear portions 40 and 40' respectively positioned slightly above mounting plate 12, the clearance shown at FIGURE 5. Numerals 42 and 43 denote a pair of threaded elements which pass through mounting brackets 38 and 39. Numerals 44 and 45 denote contact elements, to be described in detail later, formed of thin wire mesh and include, respectively, portions 46 and 47 at their tips adapted to make electrical contact with polarized armature 48.

Referring now to FIGURE 4 of the drawings, the numeral 50 denotes a generally U-shaped mounting element provided with integral ears 52 extending laterally therefrom, the ears lying on mounting plate 12 and affixed by suitable fastening elements. A central aperture is provided adjacent the top of bracket 50 and threadedly receives pivot mounting screw 54, internally recessed to receive compression spring 56 and jewel bearing 58. Another jewel bearing 60 is placed in a recess in mounting plate 12, bearing 60 lying directly below upper bearing 58. Referring now also to FIGURE 6, housing block 62, with recess 64 extending completely therethrough, is provided at diametrically opposite portions with pintle elements 66 and 68 lying, respectively, in recesses in jewel bearings 58 and 60. The numeral 70 denotes a right cylindrical permanent magnet having its poles at the flat ends. The magnet is positioned in recess 64, coupling elements 72 and 74, surrounding armature halves 48, abut block 62 to sandwich the latter. As seen in FIGURE 6, the armature 48 is of two portions of magnetic material, one end of each portion contiguous to magnet 70.

Referring now to FIGURE 5 of the drawings, the numerals 76 and 77 denote metal rings extending through mounting plate 12 and encompassing glass discs 78 and 79 respectively. Electrical leads 80 and 82 from ears 40 and 40' pass through metal tubes 83 and 83' in glass portions 78 and 79 to terminals 84 and 86 respectively, the terminals situated on plate 88 of an insulating material such as Fiberglas board. The upper portions of leads 80 and 82 are soldered to the interior of tubes 83 and 83' respectively, the solder forming a hermetic seal between the upper and lower parts of the tubes. The numeral 90 denotes another metal ring which passes through mounting plate 12 and surrounds another glass portion 92. Conductor 94 passes through glass 92 and is secured to an upper terminal 96 at its upper end and terminal 98 at its lower end. As best seen in FIGURE 1, a somewhat flexible conductor 100 is secured to one armature block 72 at one end and to terminal 96 at the other end to form a current path from terminal 98 to armature 48.

As illustrated in FIGURES 3 and 8 of the drawings, bolts 102 pass between mounting plate 12 and insulating plate 88. The upper end of each bolt 102 is threaded and soldered in mounting plate 12 while the lower end is headed as at 104. Bolts 102 do not pass through either magnetic plate 36 or shock absorbing plate 106. The position of bolts 102 relative to plate 88 is shown in FIGURE 8.

Apertures 108 and 110 are provided in plate 88 (FIGURE 8) through which pass the termini of field windings 24 and 26 respectively. One manner of connecting the field windings is illustrated, the numeral 112 denoting one connection between the termini of windings 26 and 26', the numeral 114 denoting a connection between windings 24 ad 24'. Termini 116, 118, 120 and 122 pass through side apertures 108 and 110 and pass below plate 88.

As illustrated in FIGURE 7 of the drawings, the periphery of an upper casing 121 with vent tube 124 is located on top of mounting plate 12 and a lower casing 126 is placed on the bottom of the mounting plate. After the placement of the upper casing and soldering the periphery, as indicated at S, to the plate 112, the atmosphere within casing 121 is made inert through tube 124 after which it is sealed as by crimping. Thus, all elements above plate 12 operate in an inert atmosphere. Alternatively, the atmosphere within casing 121 and above plate 12 may be filled with a reducing gas. In any event, atmosphere surrounding the elements on top of plate 12 is captive. Similarly, the periphery of the lower casing 126 is soldered, as indicated by S, to the underside of plate 12. A rubber grommet 128 in the central portion of lower casing 126 receives conductors 116, 118, 120 and 122 and also the leads (note FIGURE 5) from terminals 84, 86 and 98 and the armature connection. Size at 128 is chosen such that the hole is effectively sealed against passage of dirt particles, although gases may pass readily.

Referring now to FIGURES 9 and 10 of the drawings, the casing 121 and 126 are placed on the upper rim of steel-wool annulus 130. Steel-wool band 134 is wrapped around the casings and steel-wool pad 132 placed on top of casing 121. The termini are connected to prongs 127 of plug 128, upon which annulus 130 rests. Casing 139 is now placed over the entire assembly, suitably fastened to plug 128, and fabrication is now complete. Preferably, casing 139 is of a high permeability material to shield the relay from stray fields and also to localize magnetic fields created by the relay's operation.

A method of making contact elements 44 and 45 will now be described. Referring to FIGURE 11, the numeral 200 denotes a plurality of layers of thin wire mesh wrapped completely around hollow male portion 202 of upper die 204. The die and the extension are provided with a central aperture 206. A lower die 208 with a rounded bottom cavity 210 and circumferential shoulder 212 cooperates with the upper die to compress and compact the mesh 200 upon downward movement of upper die. As illustrated at FIGURE 12, shoulder 212 limits the extent of downward motion of the upper die to preclude excessive compacting of the mesh. When the upper die 204 has reached its downward limit of travel, an elongated tool 213 is placed in aperture 206 and moved downwardly until its lower tip engages the mesh 200. The mesh between the lower tip and the bottom cavity 210 is compressed and compacted by the tool and fuses to thereby form a portion 214 of greater density than the remainder of the mesh. Portion 214 is the same as portions 46 and 47 of FIGURE 2. The portion 214 thus comprises the same metal as that of mesh 200 but is completely compacted and fused to form a homogeneous mass. If desired, the operation employing tool 213 may be omitted, the mesh without contact tip 214 serving, for example, in applications where currents are low. Elements 44 and 45 result from the compression step of FIGURES 11 and 12 and their tips 46 and 47 from the step employing the tool 213.

FIGURE 13 illustrates a method of modifying the final product of the steps of FIGURES 11 and 12 to facilitate its mounting to a contact such as screw 42 or 43. According to this method, the mesh article is placed into a lower female die member 216, the same upper die 204, for convenience, being employed. Die 216 is provided with a cavity 217 which defines an upper peripheral rim 218. The mesh element is placed in the cavity 217 with its upper peripheral portion flaring outwardly, as indicated by the numeral 220. A copper or other fairly soft ring 222 is placed on rim 218 and is thus sandwiched by the rim and the flaring portion 220. Upper die 204 is now moved downwardly and copper ring 222 is compressed and fuses with peripheral flaring portion 220. The resulting fusion is denoted by numeral 224 in FIGURE 14. The contact element may now be easily affixed, as by soldering portion 224 to a contact member such as 42 or 43.

FIGURE 14 also illustrates an alternative method of providing the mesh contact member with a contact point. The contact point here comprises a button 226 having an integral pintle 228 extending through mesh 200 and carrying a washer 230 fixed to the pintle as by peening. Button 226 may be of any desired conducting material, as for example palladium. In the construction here illustrated, the desirable point contact properties of a specific conductor, such as palladium, may be combined with the desirable mechanical features of the wire mesh 200. In other applications, the portion 214, formed of the same material from which the mesh 200 is formed, may be suitable.

FIGURE 15 illustrates a modified construction of a contact member and includes a wire mesh strand 234 of generally rectangular cross-section forming an element of generally U-shape. The ends of the U are placed interiorly of base 236 having a hollowed portion 238 or any other suitable recesses to receive the ends. The ends may be secured as by soldering. Mid-way of the bight portion of strand 234 a contact button 240 is situated, similar to contact button 226 of FIGURE 14. If desired, the button 240 may be entirely omitted. Alternatively, a fused tip, such as 214 of FIGURES 12 and 13, may be used in lieu of the button contact.

The operation of the relay will now be given. The connections between coils 24, 24', 26 and 26' may be such that current flow, from an external control source, causes leg pieces 18 and 22 to be of North polarity while poles 18' and 22' will be of South polarity. If the armature is polarized as indicated at FIGURE 1 of the drawings, i.e., the South pole being remote from the viewer, the armature will rotate in a direction which carries the North portion toward field piece 18' while carrying the South portion towards field pole 22. Thus poles 18' and 22 each attract the armature while pole faces 18 and 22' repel the armature. Reversing the current flow from an external control source, causes 18 and 22 to be of South polarity, 18' and 22' of North polarity, the armature will rotate in a direction opposite to the previously described motion, carrying the North armature portion towards 18 and the South toward 22'. Thus, poles 18 and 22' each attract and poles 18' and 22 repel the armature. In rotating from one position to the other, the armature makes, alternately, electrical contact with contact portions 46 and 47 of contacts 44 and 45. Because of the nature of contacts 44 and 45, most of the kinetic energy of the rotating armature is absorbed by them, thus inhibiting chatter or vibration of the armature after initial mechanical contact with either of contact portions 46 or 47. It is believed that the major portion of the kinetic energy of the armature is transformed into heat by friction between the various thin metal filaments which make up elements 44 and 45.

It is to be pointed out, that the above described mode of connecting the field windings 24, 24', 26 and 26' is only one of several modes. For example, any of the four field windings could be permanently energized to thereby effect a bias position of the armature while the remaining three field windings would serve to overcome this biasing and thus make contact with the other terminal 44 or 45. In such an instance, the relay would function as a voltage comparator.

An alternative arrangement for polarizing the armature ance of any of the field pieces or their connections to the and also for correcting any variations in magnetic reluctcommon magnetic path plate 36 is illustrated at FIGURE 16 of the drawings. The numerals 16, 16', 20 and 20' denote those portions of plate 36 which are abutted by the lower ends of the field pieces. Plate 36 is illustrated as formed of two halves 36' and 36". The armature is assembled without the permanent magnet 70 therein and a small permanent magnet M is placed between the two halves as indicated. The small permanent magnet M produces the polarizing magnetic field formally due to permanent magnet 70 in the armature. Both the position and the orientation (of the North-South axis) of the magnet M may be varied, as indicated by the arrows.

FIGURE 17 of the drawings illustrates still another arrangement for correcting variations in magnetic reluctance and for producing polarization wherein the common magnetic flux plate 36 is provided with a neck 360 around which a coil W is wound. The numerals 16, 16', 20 and 20' denote the locations of the lower faces of the field pieces where they abut plate 36. An energizing current is passed through the coil W and polarizes the relay, thus the armature may be made without the small permanent magnet 70 therein. This embodiment enjoys a remote variation of both direction and magnitude of the polarizing magnetic field and exhibits utility in certain logic applications as well as conventional relay applications.

We claim:

1. An electromagnetic polarized relay comprising, in combination; a substantially flat non magnetic mounting plate having a plurality of apertures extending therethrough; a plurality of field pieces extending through said apertures in said plate, said field pieces composed of magnetic ferrite material, said ferrite material having the characteristics of high ohmic resistance and high permeability; each of said apertures being filled with non magnetic material contacting both the field piece extending therethrough and said plate, thereby forming a hermetic seal therebetween; a plate composed of magnetic material positioned on one side of said mounting plate, said plate composed of magnetic material and connected to each of said field pieces to form a common magnetic path therebetween; an energizing winding coiled around at least one of said field pieces; a polarized armature pivotally mounted on the other side of said mounting plate, said armature having two ends and including a permanent magnet positioned between said ends to provide magnetic poles of opposite polarity at said ends, said pivotally mounted armature pivoted at the central point between said ends to provide a pivotal motion in a plane parallel to said mounting plate; at least two of said field pieces being positioned on opposite sides of said armature and having terminal portions adjacent to said ends of said armature in said plane of pivotal motion; at least two of said field pieces being longitudinally spaced with respect to said armature and having terminal portions adjacent to said ends of said armature in said plane of pivotal motion; a pair of electrical contacts mounted on said mounting plate on opposite sides of said armature and positioned to make electrical contact with said armature when said armature is pivoted into engagement therewith, said armature having a substantially smooth surface in the area of said electrical contact; said armature and said field pieces so correlated that upon the energization of said winding a strong magnetic circuit is formed including said plate composed of magnetic material, two of said field pieces and said armature; and the utilization of said field pieces composed of said ferrite material minimizes eddy current losses during the energization of said winding, provides low magnetic retentivity therein in the absence of said energization, and provides a bi-stable operation for said armature.

2. The combination set forth in claim 1 wherein each of said contacts includes a wire mesh contact element extending from a mounting element to the portion thereof which contacts said smooth surface of said armature, said wire mesh contact element including a first portion thereof of a first density and a second portion thereof of a substantially greater density, said second portion being arranged to contact said smooth surface of said armature, and said mesh contact element absorbs most of the kinetic energy of said armature upon the actuation thereof, whereby chatter of said armature is substantially precluded.

3. An electromagnetic polarized relay comprising, in combination; a substantially flat non magnetic mounting plate having a plurality of apertures extending therethrough; a plurality of field pieces extending through said apertures in said plate, said field pieces composed of magnetic material, each of said apertures being filled with non magnetic material contacting both the field piece extending therethrough and said plate, thereby forming a hermetic seal therebetween; a plate composed of magnetic material positioned on one side of said mounting plate, said plate composed of magnetic material connected to each of said field pieces to form a common magnetic path therebetween; an energizing winding coiled around at least one of said field pieces; a polarized armature pivotally mounted on the other side of said mounting plate, said armature having two ends and including a permanent magnet positioned between said ends to provide magnetic poles of opposite polarity at said ends, said pivotally mounted armature pivoted at the central point between said ends to provide a pivotal motion in a plane parallel to said mounting plate; at least two of said field pieces being positioned on opposite sides of said armature and having terminal portions adjacent to said ends of said armature in said plane of pivotal motion; at least two of said field pieces being longitudinally spaced with respect to said armature and having terminal portions adjacent to said ends of said armature in said plane of pivotal motion; a pair of electrical contacts mounted on said mounting plate on opposite sides of said armature and positioned to make electrical contact with said armature when said armature is pivoted into engagement therewith, said armature having a substantially smooth surface in the area of said electrical contact, each of said contacts including a wire mesh contact element extending from a mounting element to the portion thereof which contacts said smooth surface of said armature, said wire mesh contact element including a first portion thereof of a first density and a second portion thereof of a substantially greater density, said second portion being arranged to contact said smooth surface of said armature; said armature and said field pieces so correlated that upon the energization of said winding a strong magnetic circuit is formed including said plate composed of magnetic material, two of said field pieces and said armature; and upon the actuation of said armature, said mesh contact element absorbs most of the kinetic energy of said armature, whereby chatter of said armature is substantially precluded.

References Cited by the Examiner
UNITED STATES PATENTS

| | | | |
|---|---|---|---|
| 2,166,091 | 7/1939 | Field | 200—87 |
| 2,487,187 | 11/1949 | Seifried et al. | 200—166 |
| 2,675,443 | 4/1954 | Wyckoff | 200—98 |
| 2,679,563 | 5/1954 | Katsumata | 200—98 |
| 2,741,728 | 4/1956 | Distin | 200—93 |
| 2,914,640 | 11/1959 | Grattidge | 200—166 |
| 2,931,877 | 4/1960 | Henley | 200—166 |
| 2,937,434 | 5/1960 | Swift | 29—155.55 |
| 2,938,094 | 5/1960 | Nass | 200—164 |
| 2,995,637 | 8/1961 | Fiener et al. | 200—87 |
| 3,048,678 | 8/1962 | Reed et al. | 200—93 |
| 3,069,602 | 12/1962 | Stout et al. | 200—93 X |
| 3,072,830 | 1/1963 | Lazzarini | 317—197 |
| 3,075,281 | 1/1963 | Spooner | 29—155.55 |
| 3,092,762 | 6/1963 | Roters et al. | 317—197 |

BERNARD A. GILHEANY, *Primary Examiner.*
ROBERT K. SCHAEFER, *Examiner.*
T. A. ROBINSON, ROY N. ENVALL, JR.,
*Assistant Examiners.*